July 19, 1955  G. K. MEDICUS  2,713,523
MAGNETIC SUSPENSION FOR ROTATING STRUCTURES
Filed Feb. 26, 1952
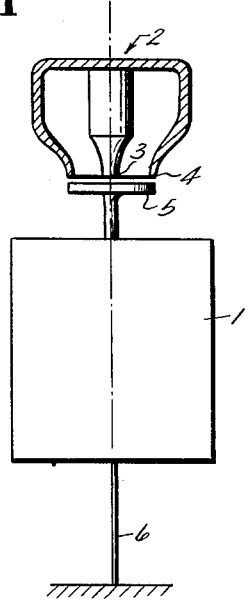
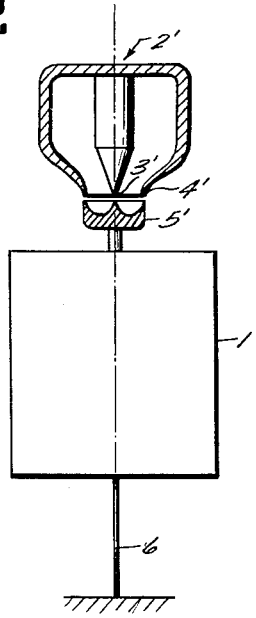
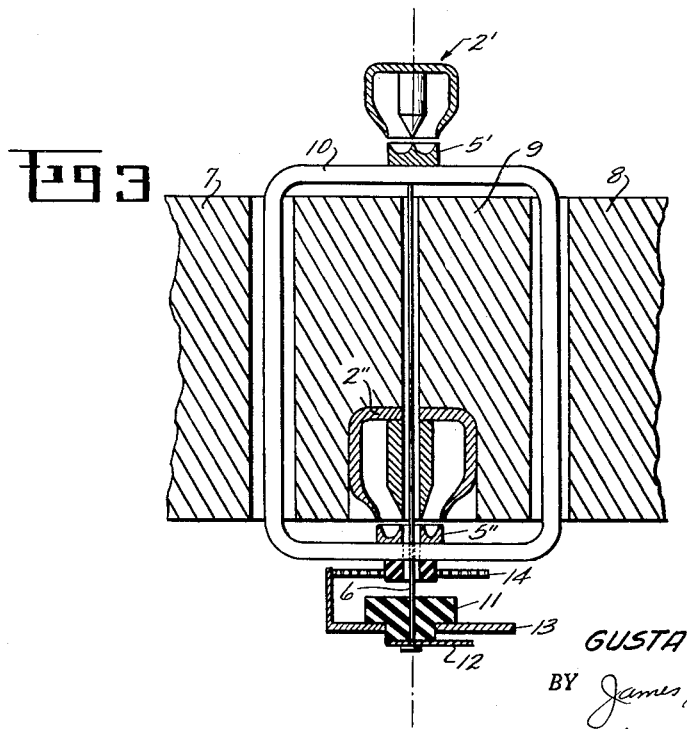
INVENTOR.
GUSTAV K. MEDICUS
BY James S. Shannon
AGENT
Wade Knotts
ATTORNEY

2,713,523

MAGNETIC SUSPENSION FOR ROTATING STRUCTURES

Gustav K. Medicus, Dayton, Ohio

Application February 26, 1952, Serial No. 273,531

3 Claims. (Cl. 308—10)

(Granted under Title 35, U. S. Code (1952), sec. 266)

The invention described herein may be manufactured and used by or for the United States Government for governmental purposes without payment to me of any royalty thereon.

This invention relates to magnetic suspensions for rotating structures and particularly to magnetic suspensions for the rotating elements of sensitive electric instruments.

Conventional suspension systems for the moving structures of sensitive electrical instruments suffer either from low radial stability or from low sensitivity. In the case of the conventional gravity suspension radial stability is poor, while with the expansion filament suspension, if made rugged enough to provide sufficient stability, the sensitivity is low. In the case of bearing type supports, the frictions introduced by the bearings is prohibitive for sensitive instruments. In comparison to the above, magnetic suspensions have good radial stability and are devoid of friction.

It is the object of the invention to provide a magnetic suspension of the above type in which a pot type magnet designed to provide increased attractive and centering forces is used.

The suspension will be described in more detail in connection with the accompanying drawings, in which:

Fig. 1 shows a pot magnet suspension in which centering force is exerted by the annular pole;

Fig. 2 shows a pot magnet suspension in which centering force is exerted by both the center and annular poles; and Fig. 3 shows a suspension particularly suited to moving coil systems.

Referring to Fig. 1, 1 represents the rotating electrode structure, either electrostatic or electrodynamic, of an electrical instrument. Several examples of suitable electrostatic electrode structures are described and claimed in my applications Serial Nos. 273,532 (now abandoned) and 273,533 filed February 26, 1952. A pot magnet, having center pole 3 and annular pole 4, is fixedly supported by the body of the instrument. A disc of magnetic material 5 is attached to one end of the rotating element 1 at its center of rotation. A torsion fiber 6 is attached to the other end of element 1 at its center of rotation. The other end of fiber is fastened to the body of the meter at a point directly under the center of pole 3. The length of fiber 6 is made such that a small air gap exists between the poles of magnet 2 and the disc 5, and as a result the fiber is maintained taut by the pull of the magnet on the disc. The diameter of disc 5 is made equal to the outer diameter of annular pole 4 which acts to keep the disc centered. The restoring force is supplied by the torsion in fiber 6.

The suspension shown in Fig. 2 is similar to that shown in Fig. 1 with the exceptions that the faces of poles 3' and 4' have been narrowed and that the disc 5' is thicker than disc 5 and has an annular groove in its face to provide a raised center opposite pole 3' and a raised rim opposite pole 4'. With this construction the center pole 3', as well as the annular pole 4', exerts a centering force on the magnetic element 5'.

The construction shown in Fig. 3 is particularly suited to the rotating coil type of instrument. In this figure, 7 and 8 are the poles of the meter magnet. A cylindrical core 9 is positioned between the pole faces so that air gaps are formed between the cylinder and the pole faces. A frame 10 carrying a coil of wire is adapted to rotate in the air gaps. Two magnetic suspensions 2'—5' and 2"—5" and a fiber 6 are used to rotatably position the frame 10 within the air gaps. Suspension 2'—5' is similar in all respects to the suspension of Fig. 2 and magnet 2' is fixedly supported on the body of the meter. Suspension 2"—5" is also similar to that of Fig. 2 except that an axial passageway is provided for fiber 6. Magnet 2" is supported by the core 9. Fiber 6 is attached to frame 10 at the top but passes through a hole in the lower end of the frame to its anchor in block 11, which is attached to the meter body. Fiber 6 is maintained taut by the upward pull exerted by magnets 2' and 2" on elements 5' and 5" which are attached to frame 10. One connection to the coil or frame 10 may be made through terminal 12 and fiber 6, which in this case must be conductive. The instrument shown in Fig. 3 is also suitable for deflection in both directions, as in the case of a galvanometer, however, for maximum symmetry in this case an additional spiral, wound in the opposite direction to spiral 14, may be used. In the latter case, the additional spiral, instead of the fiber, may serve as one of the connections.

I claim:

1. A rotating structure and a magnetic suspension therefor, said suspension comprising: a pair of fixed pot magnets spaced apart in axial alignment and facing in the same direction, each of said magnets having concentric center and annular poles, and one of said magnets having an axial passageway through its center pole; first and second ferromagnetic disc-like elements of substantially the same diameters as said annular poles, said ferromagnetic elements being attached to said rotating structure so as to be perpendicular to and concentric with its axis of rotation and so as to be spaced apart by a distance equal to the separation of said magnets, and the second of said ferromagnetic elements having an axial passageway therethrough; and means for positioning said rotating structure so that said ferromagnetic elements are opposite and close to the pole faces of said magnets and so that said second ferromagnetic element is opposite said magnet having an axial passageway, said means comprising a filament attached at one end to said rotating structure at a point on its axis and near to said first ferromagnetic element, passing through the said passageways in said magnet and second ferromagnetic elements, and attached at its other end to a fixed point on the extended axis of said magnets, the length of said filament being such as to form a small air gap between the faces of said disc-like ferromagnetic elements and the pole faces of said magnets, whereby said disc-like elements are attracted to said magnets and said filament is maintained taut by said attraction.

2. Apparatus as claimed in claim 1 in which said disc-like elements have annular concentric grooves in their faces opposite said magnets whereby each of said faces is provided with a raised center part and an annular ridge part positioned opposite the center pole and annular pole, respectively, of the associated magnet.

3. A rotatable structure and means for suspending same for rotation about an axis, said suspension means comprising: means providing a fixed anchor point on said axis; a first fixed annular magnetic pole means concentric with said axis and facing said anchor point; a second fixed annular magnetic pole means concentric with said axis, located between said first pole means and said anchor point, and facing said anchor point, said second pole means having an axial passageway therethrough; a first annular ferromagnetic armature means, shaped so as to be self-centering relative to said first pole means, attached to said rotatable structure so as to be concentric with said axis and situated adjacent to and on the anchor point side of said first pole means; a second annular ferromagnetic armature means, shaped so as to be self-centering relative to said second pole means, attached to said rotatable structure so as to be concentric with said axis and situated adjacent to and on the anchor point side of said second pole means, said second armature means being axially spaced from said first armature means by a distance equal to the axial spacing of said first and second pole means and having an axial passageway therethrough; and a torsion fiber attached to an axial point on said rotatable structure between said first and second armature means and near said first armature means, said fiber extending through the passageways of said second pole and armature means to said fixed anchor point to which it is attached, the length of said fiber being such as to provide small air gaps between said first and second pole means and said first and second armature means, respectively.

References Cited in the file of this patent

UNITED STATES PATENTS

| Number | Name | Date |
|---|---|---|
| 658,814 | Stanley et al. | Oct. 2, 1900 |
| 675,996 | Gutman | June 11, 1901 |
| 1,472,198 | Taylor | Oct. 30, 1923 |
| 1,952,161 | Faus | Mar. 27, 1934 |

FOREIGN PATENTS

| Number | Country | Date |
|---|---|---|
| 23,991 1904 | Great Britain | May 4, 1905 |
| 322,995 | Great Britain | Dec. 16, 1929 |
| 68,119 | Austria | Mar. 10, 1915 |